No. 751,951. PATENTED FEB. 9, 1904.
W. S. SHILLING.
RAIL JOINT.
APPLICATION FILED AUG. 31, 1903.
NO MODEL.
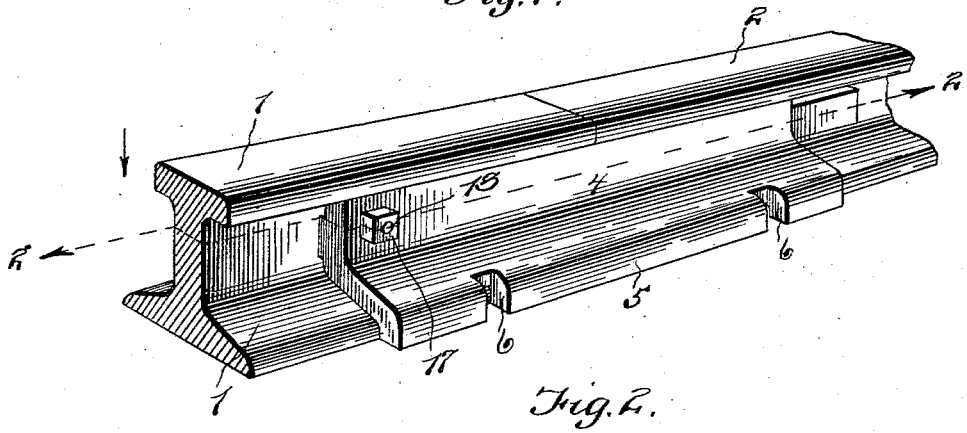
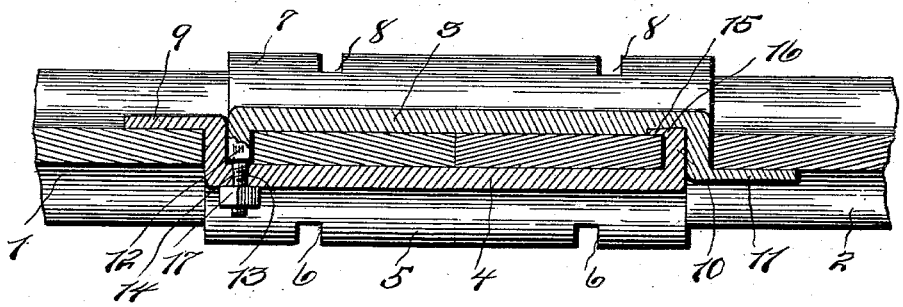
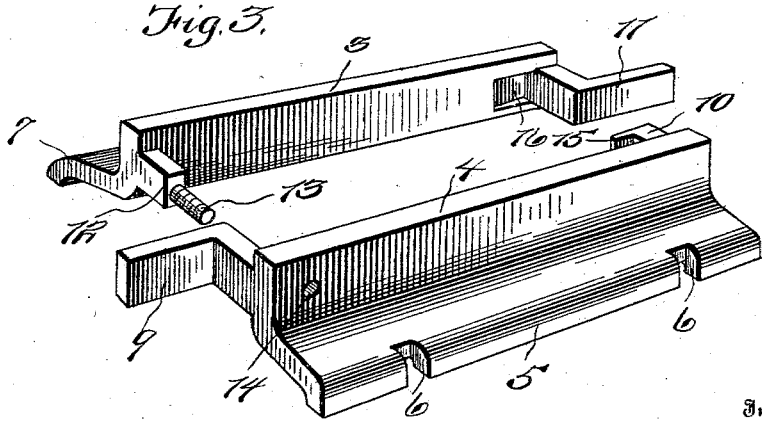
Inventor
Willard S. Shilling.
Witnesses
R. A. Boswell
A. G. Miller
By W. T. Fitzgerald
Attorneys.

No. 751,951. Patented February 9, 1904.

UNITED STATES PATENT OFFICE.

WILLARD S. SHILLING, OF NEW CONCORD, OHIO.

RAIL-JOINT.

SPECIFICATION forming part of Letters Patent No. 751,951, dated February 9, 1904.

Application filed August 31, 1903. Serial No. 171,391. (No model.)

*To all whom it may concern:*

Be it known that I, WILLARD S. SHILLING, a citizen of the United States, residing at New Concord, in the county of Muskingum and State of Ohio, have invented certain new and useful Improvements in Rail-Joints; and I do hereby declare the following to be a full, clear, and exact description of the invention, such as will enable others skilled in the art to which it appertains to make and use the same.

My invention relates to rail-joints; and it consists of certain novel features of combination and construction of parts, the preferred form whereof will be hereinafter clearly set forth.

The prime object of my invention, among others, is to provide a reliably-efficient form of joint whereby the meeting ends of the rail will be securely held in operative relationship to each other without weakening said ends except to provide a simple form of aperture in each of them.

A further object of my invention is to provide connecting means for the ends of the rail whereby said means may be quickly disengaged and restored to its operative position.

Other objects and advantages will be hereinafter made clearly apparent, reference being had to the accompanying drawings, which are made a part of this application, and in which—

Figure 1 shows a perspective view of my invention complete as applied to use upon track-rails of the usual construction. Fig. 2 is a longitudinal section of Fig. 1 on line 2 2. Fig. 3 is a perspective detail view of my securing device ready to be applied to use upon the meeting ends of track-rails.

For convenience in designating the various details of my invention and coöperating accessories numerals will be employed, the same numeral applying to a similar part throughout the several views.

Referring to the numerals on the drawings, 1 and 2 designate the meeting ends of track-rails of the usual or any preferred construction, while 3 and 4 indicate complementary clamping sections or members which are adapted to engage with each other and also with the ends of the track-rails interposed between them.

The fish-plates or members 3 and 4 are each designed to lie snugly against the sides of the abutted rails, and therefore conform to the shape of said rails, as is common, whereby a more perfect union may be insured.

The fish-plate 4 is provided with an outwardly-extending flange 5, having spike-receiving recesses 6, while the fish-plate 3 is provided with the flange or base 7, corresponding to the flange 6, and is similarly provided with spike-receiving recesses 8, whereby said base-sections may be very reliably held in engagement with the supporting-tie. The fish-plate 4 is provided upon one end with the angular arm or elbow 9 and upon the other end with a hook-like extension or bracket 10. The fish-plate 3 is similarly provided with an angular arm or elbow 11, corresponding to the elbow 9, while upon the opposite end a lug 12 is formed, which terminates in a threaded extension or bolt 13, adapted to enter the aperture 14 in an opposite part of the fish-plate 4.

The web of each of the rail-sections 1 and 2 is provided near its end with a suitable opening of sufficient size to receive the said extensions 9 and 12 and the extensions 10 and 11, and in order that the hook-like extension 10 may pass through the aperture in the web of the rail sufficiently to dispose the lip 15 on the opposite side of said web I form in a contiguous part of the inner surface of the fish-plate 3 a recess 16 of proper size to receive the lip 15 and the end of the extension 10.

In placing my fish-plates in their operative positions relative to each other and to the abutted ends of the track-rail I first enter the angular arm or elbow 9 into the aperture in the web of the rail 1, as shown in Fig. 2. I then dispose the fish-plate 4 parallel and in contact with the web of the two abutted rails, when by moving the fish-plate 4 toward the rail 2 the lip 15 may be entered in the aperture provided in the web of the rail 2, when by a reverse longitudinal movement of the fish-plate 4 the lip 15 will be brought upon the opposite side of the web of the rail 2. When the fish-plate 4 is in this position, the fish-plate 3 may be disposed in its operative position by entering the angular arm 11 in the recess provided in the web of the rail 2, thereby disposing the terminal of the arm 11 upon the opposite side of the web of said rail, when the fish-plate 3 may be readily moved parallel to and in close engagement with the web of the rails, and thereby cause the threaded terminal or bolt 13 to enter the aperture 14 in the fish-plate 4 and at the same time dispose the lug or extension 12 within the recess formed in the web of the rail 1, said lug being disposed parallel with the angular part of the arm 9, when by placing the single locking-nut 17 upon the bolt 13 all of said parts may be very reliably and securely locked in union with each other.

It will thus be seen that I have provided a very reliable and efficient form of securing device for holding the abutted ends of track-rails together, said union being effected by the employment of but a single locking-nut. It will furthermore be apparent that the several parts of my rail-securing device may be quickly separated or removed from their operative positions for the purpose of replacing any broken part or for removing the worn or broken rail.

While I have described the preferred combination and construction of parts deemed necessary in carrying out my invention, I wish to comprehend in this application all substitutes and equivalents that may be considered as falling within the scope thereof.

Believing that the advantages and manner of applying my improved rail-securing device to use have thus been made clearly apparent, further description is deemed unnecessary.

What I claim as new, and desire to secure by Letters Patent, is—

1. The herein-described securing device for the abutted ends of track-rails comprising the combination with the track-rails having suitable apertures in the webs thereof, of complementary fish-plates each provided with an inwardly-directed extension adapted to pass through said apertures and engage or interlock with each other and suitable means comprising a hook-like member carried by one plate and a threaded bolt extension carried by the other plate to hold them in operative combination substantially as specified and for the purpose set forth.

2. The herein-described securing device for the abutted ends of track-rails comprising the combination with the track-rails having suitable apertures in the webs thereof, of complementary fish-plates, one of which is provided with an angular arm and its opposite end with a hook-like extension, while the other plate is provided at one end with an angular arm and at its opposite end with a threaded bolt extension adapted to enter an orifice in the first-mentioned plate and receive a nut, whereby said plates and rails will be locked together when assembled, as set forth.

In testimony whereof I affix my signature in presence of two witnesses.

WILLARD S. SHILLING.

Witnesses:
 W. H. BARNETT,
 JOHN BARNETT.